United States Patent
Shirai et al.

(10) Patent No.: US 10,390,138 B2
(45) Date of Patent: Aug. 20, 2019

(54) AUDIO SYSTEM, AUDIO APPARATUS, AND CONTROL METHOD FOR AUDIO APPARATUS

(71) Applicant: Yamaha Corporation, Hamamatsu-shi, Shizuoka-Ken (JP)

(72) Inventors: Masakazu Shirai, Toyohashi (JP); Yuki Suemitsu, Hamamatsu (JP); Osamu Kohara, Hamamatsu (JP); Futoshi Muronaga, Hamamatsu (JP); Kazuhiro Iwashita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/921,711

(22) Filed: Mar. 15, 2018

(65) Prior Publication Data
US 2019/0075398 A1    Mar. 7, 2019

Related U.S. Application Data

(63) Continuation of application No. PCT/JP2017/032159, filed on Sep. 6, 2017.

(51) Int. Cl.
*H04R 3/12* (2006.01)
*H04R 5/02* (2006.01)
(Continued)

(52) U.S. Cl.
CPC ............. *H04R 3/12* (2013.01); *H04R 5/02* (2013.01); *H04R 5/04* (2013.01); *H04R 27/00* (2013.01);
(Continued)

(58) Field of Classification Search
None
See application file for complete search history.

(56) References Cited

U.S. PATENT DOCUMENTS

2005/0063551 A1\* 3/2005 Cheng ................... H04S 5/005
    381/18
2006/0009985 A1    1/2006 Ko et al.
(Continued)

FOREIGN PATENT DOCUMENTS

JP    2008-503147 A    1/2008
JP    2008-522468      6/2008
(Continued)

OTHER PUBLICATIONS

International Search Report (PCT/ISA/210) issued in PCT Application No. PCT/JP2017/032159 dated Oct. 31, 2017 with partial English translation (four (4) pages).
(Continued)

*Primary Examiner* — Qin Zhu
(74) *Attorney, Agent, or Firm* — Crowell & Moring LLP

(57) ABSTRACT

An audio system includes a first audio apparatus that receives a first audio signal with a first number of channels and a second audio apparatus connected to the first audio apparatus via a network. The first audio apparatus includes a signal processing unit configured to generate, on the basis of the first audio signal received from the outside of the first audio apparatus, a second audio signal with a second number of channels larger than the first number of channels, and a communication unit configured to transmit a third audio signal corresponding to a part of the channels in the second audio signal generated by the signal processing unit to the second audio apparatus.

8 Claims, 12 Drawing Sheets

(51) Int. Cl.
  *H04R 5/04* (2006.01)
  *H04R 27/00* (2006.01)
  *H04L 29/08* (2006.01)
(52) U.S. Cl.
  CPC ........ *H04L 67/12* (2013.01); *H04R 2227/003* (2013.01)

(56) References Cited

U.S. PATENT DOCUMENTS

| | | | |
|---|---|---|---|
| 2006/0039573 A1* | 2/2006 | Vernon | H04R 5/02 381/119 |
| 2007/0297459 A1 | 12/2007 | Cucos et al. | |
| 2008/0063216 A1* | 3/2008 | Sakata | H04R 27/00 381/80 |
| 2010/0241434 A1* | 9/2010 | Ono | G10L 19/008 704/500 |
| 2012/0063603 A1* | 3/2012 | Evans | H04N 21/6156 381/17 |
| 2012/0070004 A1* | 3/2012 | LaBosco | H04H 20/30 381/2 |
| 2013/0022221 A1 | 1/2013 | Kallai et al. | |
| 2014/0226834 A1* | 8/2014 | Kallai | H04R 27/00 381/80 |
| 2015/0036849 A1* | 2/2015 | Thompson | H04S 3/02 381/307 |
| 2015/0213790 A1* | 7/2015 | Oh | G10L 19/008 381/23 |
| 2015/0223002 A1 | 8/2015 | Mehta et al. | |
| 2018/0020314 A1* | 1/2018 | Sheen | H04S 7/308 |

FOREIGN PATENT DOCUMENTS

| | | |
|---|---|---|
| JP | 2012-161088 | 8/2012 |
| JP | 5328637 B2 | 10/2013 |
| JP | 2015-530825 | 10/2015 |
| JP | 2016-106485 | 6/2016 |

OTHER PUBLICATIONS

Japanese-language Written Opinion (PCT/ISA/237)) issued in PCT Application No. PCT/JP2017/032159 dated Oct. 31, 2017 with partial English translation (nine (9) pages).

\* cited by examiner

AUDIO SYSTEM, AUDIO APPARATUS, AND CONTROL METHOD FOR AUDIO APPARATUS

CROSS-REFERENCE TO RELATED APPLICATION

The present application is continuation of International Application No. PCT/JP2017/032159 filed on Sep. 6, 2017. The contents of the application are hereby incorporated by reference into this application.

BACKGROUND OF THE INVENTION

1. Field of the Invention

The present invention relates to an audio system, an audio apparatus, and a control method for the audio apparatus.

2. Description of the Related Art

There has been proposed an audio system in which a plurality of audio apparatuses are connected by a network to reproduce the same content in the plurality of audio apparatuses. For example, JP 2008-503147 A (Patent Literature 1) discloses a home theater system that performs multichannel reproduction with 5.1 channels with a center speaker, main speakers, and a sub-woofer speaker to which audio signals are input from a master and rear speakers to which audio signals are input from a slave wirelessly connected to the master. Japanese Patent No. 5328637 (Patent Literature 2) discloses a technique for converting an input audio signal with one or more input channels into an output audio signal with output channels larger in number than the input channels and performing multichannel reproduction.

SUMMARY OF THE INVENTION

However, in the related art, a configuration for expanding the number of channels of an audio signal received from the outside and performing the multichannel reproduction is complicated.

The present invention has been devised in view of the circumstances, and an object of the present invention is to provide an audio system, an audio apparatus, and a control method for the audio apparatus that can, with a simple configuration, expand the number of channels of an audio signal received from the outside and redistribute the audio signal to other audio apparatuses.

An audio system according to an aspect of the present invention includes: a first audio apparatus that receives a first audio signal with a first number of channels; and a second audio apparatus connected to the first audio apparatus via a network. The first audio apparatus includes: a signal processing unit configured to generate, on the basis of the first audio signal received from an outside of the first audio apparatus, a second audio signal with a second number of channels larger than the first number of channels; and a communication unit configured to transmit a third audio signal corresponding to a part of the channels in the second audio signal generated by the signal processing unit to the second audio apparatus.

An audio apparatus according to an aspect of the present invention includes: a signal processing unit configured to generate, on the basis of a first audio signal with a first number of channels received from an outside of the audio apparatus, a second audio signal with a second number of channels larger than the first number of channels; and a communication unit configured to transmit a third audio signal corresponding to a part of the channels in the second audio signal generated by the signal processing unit to an audio apparatus on the outside connected to the audio apparatus via a network.

A control method for an audio apparatus according to an aspect of the present invention includes: generating, on the basis of a first audio signal with a first number of channels received from an outside of the audio apparatus, a second audio signal with a second number of channels larger than the first number of channels; and transmitting a third audio signal corresponding to a part of the channels in the generated second audio signal to an audio apparatus on the outside connected to the audio apparatus via a network.

DETAILED DESCRIPTION OF THE INVENTION

Figure 1:
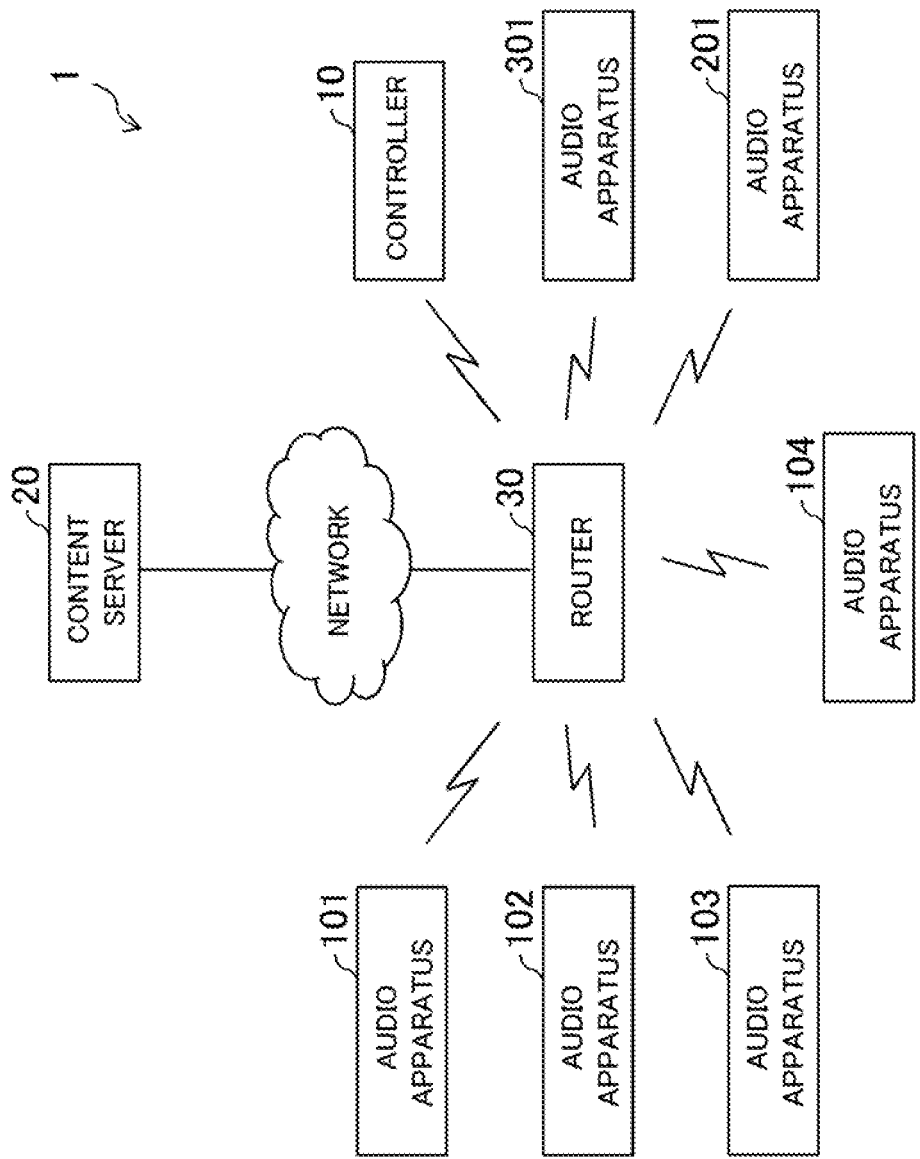
FIG. 1 is a schematic diagram showing a physical network configuration of an audio system according to an embodiment.

An embodiment of the present invention is explained below with reference to the drawings. FIG. 1 is a schematic diagram showing a physical network configuration of an audio system 1 according to this embodiment. The audio system 1 includes a controller 10, a content server 20, a router 30, and a plurality of audio apparatuses. The number of audio apparatuses is not limited. In FIG. 1, as an example, six audio apparatuses 101 to 104, 201, and 301 are shown. Note that, in the following explanation, when functions common to the audio apparatuses 101 to 104, 201, and 301 are explained, the audio apparatuses are referred to as "audio apparatus(es) 100". The content server 20 and the router 30 are connected to a network. The controller 10 and the audio apparatuses 100 are connected to the network via the router 30.

Figure 2:
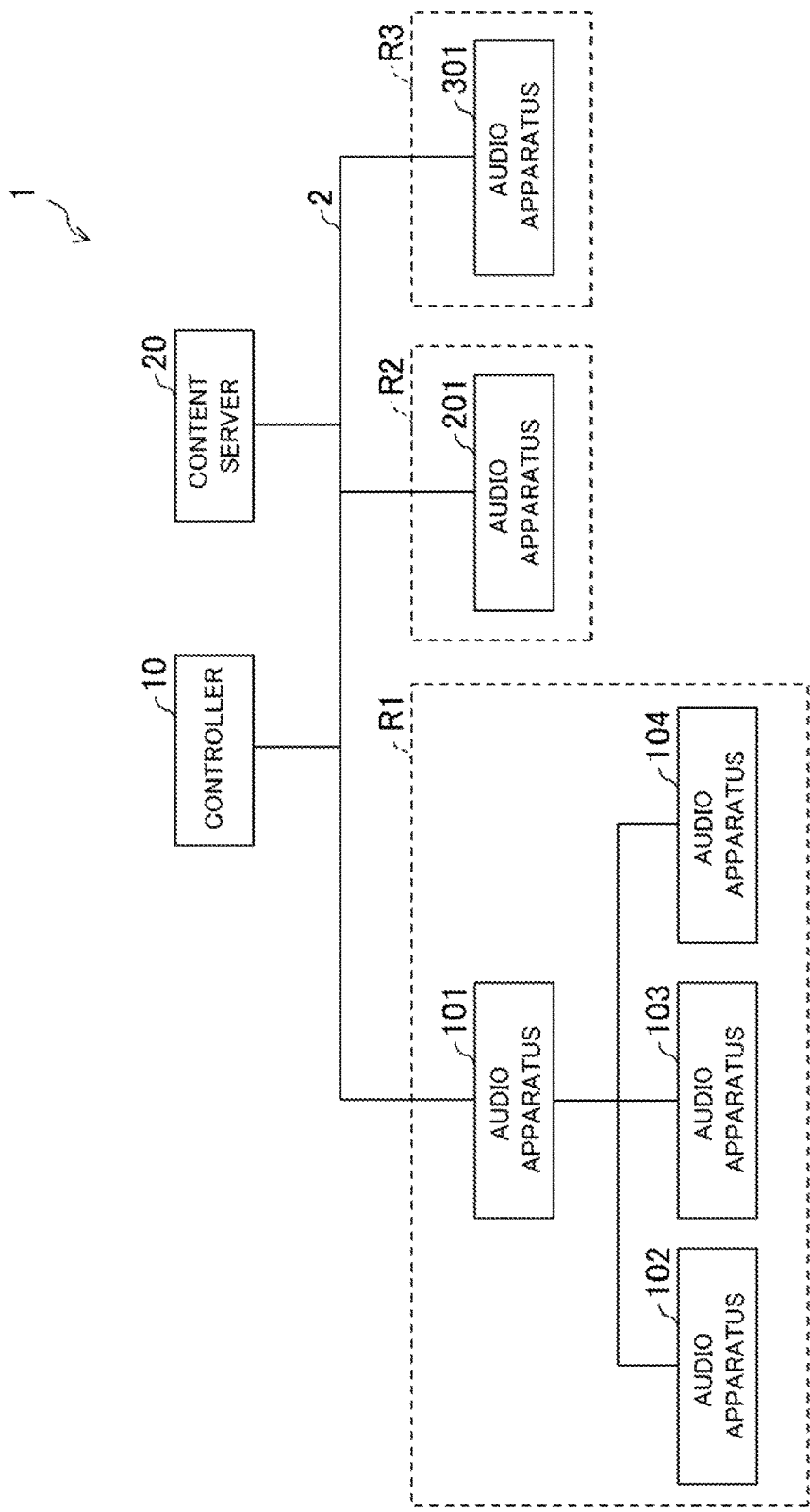
FIG. 2 is a schematic diagram showing a logical network configuration of the audio system according to the embodiment.

FIG. 2 is a schematic diagram showing a logical network configuration of the audio system 1 according to this embodiment. The controller 10, the content server 20, and the audio apparatuses 100 mutually perform transmission and reception of audio signals and commands (instructions) via a network 2. Places where the audio apparatuses 100 are set are not particularly limited. In FIG. 2, as an example, the audio apparatuses 101 to 104 are set in a living room (R1), the audio apparatus 201 is set in a kitchen (R2), and the audio apparatus 301 is set in a server room (R3).

The controller 10 is an operation terminal operated by a user such as a smartphone, a tablet computer, or a personal computer. The controller 10 has a communication function for enabling connection to the network 2. The controller 10 transmits various instructions (requests) to the content server 20 and the audio apparatuses 100 on the basis of the operation by the user. The controller 10 displays, for example, an operation screen for selecting a room in which content is reproduced (sound of the content is emitted) (see FIG. 3), an operation screen for selecting a sound source in which content is, for example, saved (see FIG. 4), and an operation screen for selecting content to be reproduced (see FIG. 5). The controller 10 transmits instructions corresponding to contents selected by the user on the operation screens to the content server 20 and the audio apparatuses 100. Note that information concerning the rooms shown in FIG. 3 and information (identification information, IP addresses, etc.) of the audio apparatuses 100 set in the rooms are associated with each other and registered in the controller 10, the content server 20, the audio apparatuses 100, and the like. Note that the controller 10 may display an operation screen for selecting the audio apparatuses 100 that reproduce content (emit sound of the content). The controller 10 may save content reproducible by an audio apparatus and have a function of a sound source.

The content server 20 is a server that saves and manages content provided to the user. The content server 20 has a communication function for enabling connection to the network 2. The content server 20 is connected to various sound sources such as the controller 10, a television, a radio, a CD (Compact Disc: registered trademark), and Internet distribution via the network 2. The content provided to the user by the content server 20 includes music and sound of the television, the radio, and the like. The content server 20 distributes (outputs) music data and sound data to a predetermined audio apparatus 100 on the basis of operation in the controller 10 (see FIG. 5) by the user. Note that, in this specification, a data signal of data (music data, sound data, etc.) of content distributed to the audio apparatus 100 by the content server 20 is referred to as "audio signal". For example, when the user selects, using the controller 10, a music file (e.g., a "song B") saved on the inside of the content server 20, the content server 20 distributes an audio signal corresponding to the "song B" to the predetermined audio apparatus 100. When the user selects a program (e.g., a "program A") of an Internet radio using the controller 10, the content server 20 distributes an audio signal of the "program A", which is broadcasted by the Internet radio, to the predetermined audio apparatus 100, for example, in a streaming scheme. Note that the content server 20 may be included in the audio apparatus 100 (e.g., the audio apparatus 301 explained below). For example, the audio apparatus 100 may save content (an audio signal) on the inside (in a storing unit 16 explained below) or may save content (an audio signal) via a storage medium (e.g., a CD or a USB (Universal Serial Bus: registered trademark)).

The network 2 includes a wireless LAN (Local Area Network), a wired LAN, and a WAN (Wide Area Network). The network 2 functions as a signal transmission path among the controller 10, the content server 20, and the audio apparatuses 100. For example, when the controller 10 is a smartphone or a tablet computer, the network 2 may be configured by a Wi-Fi (Wireless-Fidelity: registered trademark).

Figure 6:
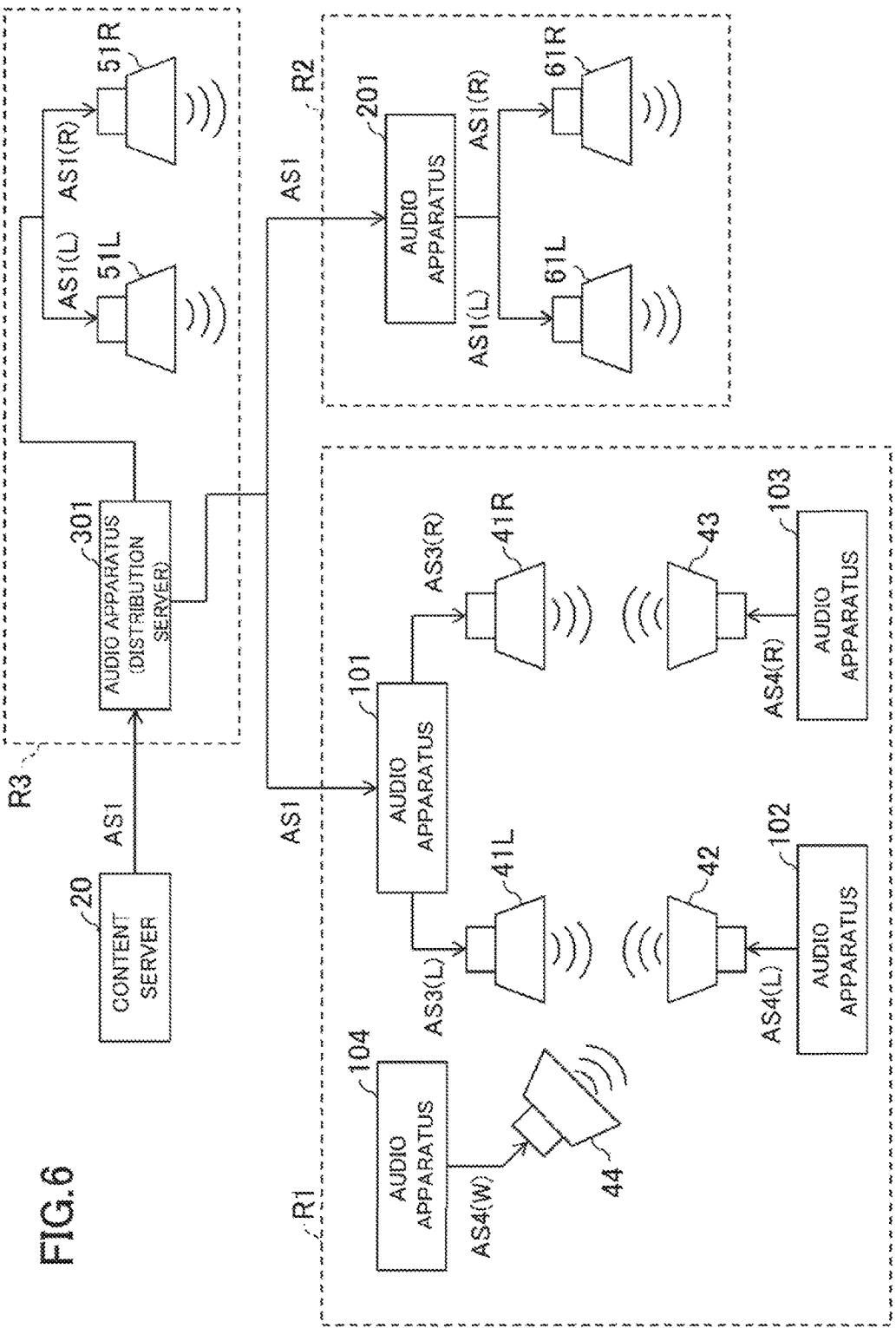
FIG. 6 is a diagram showing an example of a network configuration of the audio system according to the embodiment.

The configuration of the audio apparatus 100 is explained. The audio apparatuses 101 to 104, 201, and 301 have the same configuration one another. The audio apparatuses 101 to 104, 201, and 301 may have a function of a distribution server that receives an audio signal distributed from the content server 20 and distributes the received audio signal to other audio apparatuses. In the following explanation, a network configuration in which the audio apparatus 301 functions as the distribution server as shown in FIG. 6 is explained as an example.

The audio apparatus 301 (a third audio apparatus) receives an audio signal AS1 (a first audio signal) distributed from the content server 20 and distributes the received audio signal AS1 to the audio apparatus 101 (a first audio apparatus) and the audio apparatus 201 (a fourth audio apparatus).

Figure 7:
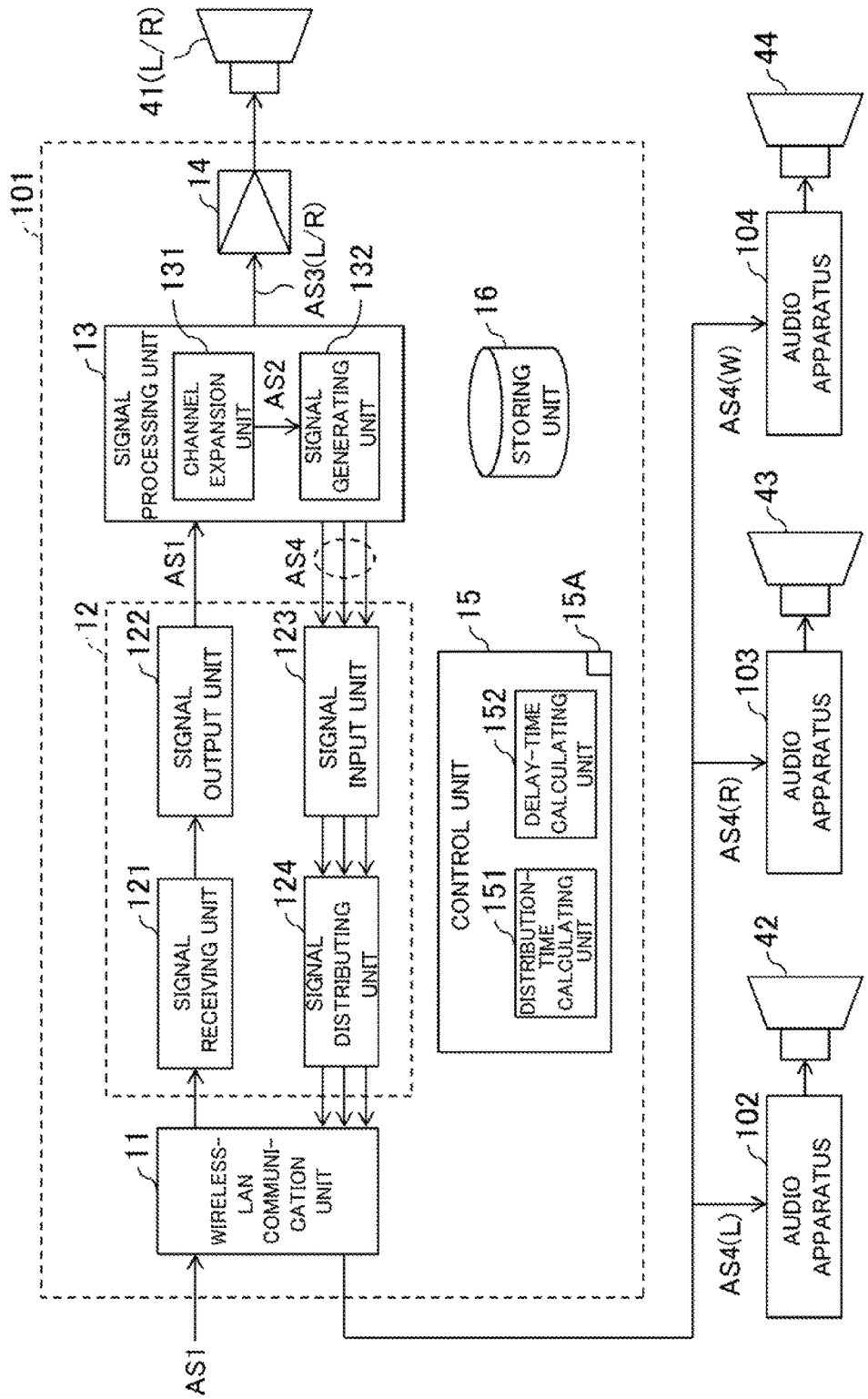
FIG. 7 is a block diagram showing the configuration of an audio apparatus according to the embodiment.

FIG. 7 is a block diagram showing the configuration of the audio apparatus 101. The audio apparatus 101 includes a wireless-LAN communication unit 11, a signal transfer unit 12, a signal processing unit 13, a power amplifier 14, a control unit 15, and a storing unit 16. Speakers 41L and 41R are connected to the power amplifier 14. The speakers 41L and 41R may be included in the audio apparatus 101. The signal transfer unit 12 includes a signal receiving unit 121, a signal output unit 122, a signal input unit 123, and a signal distributing unit 124. The signal transfer unit 12 transfers an audio signal in a predetermined signal format (e.g., a PCM (Pulse Code Modulation) format). Note that the audio apparatuses 100 have the same configuration as the configuration of the audio apparatus 101 shown in FIG. 7. In the following explanation, in the audio apparatuses 100, the same components as the components of the audio apparatus 101 are denoted by the same reference numerals and signs as the reference numerals and signs of the components shown in FIG. 7.

The control unit 15 includes a CPU (Central Processing Unit) and a memory. The CPU controls the units of the audio apparatus 101 and executes various kinds of information processing and signal processing. The memory retains various computer programs (including an audio system program 15A) and data. A work area of the CPU is secured in the memory. The control unit 15 controls, for example, the operations of the wire less-LAN communication unit 11, the signal transfer unit 12, and the signal processing unit 13 (signal processing means) according to the audio system program 15A. The control unit 15 performs transmission and reception of various signals and instructions to and from the controller 10, the content server 20, and the audio apparatuses 100 via the network 2.

The wireless-LAN communication unit 11 performs wireless communication with the controller 10, the content server 20, and the audio apparatuses 100. Although not shown in FIG. 7, the audio apparatus 101 includes a wired-LAN communication unit. The wired-LAN communication unit may perform wired communication with the controller 10, the content server 20, and the audio apparatuses 100.

In the signal transfer unit 12, the signal receiving unit 121 receives, via the wireless-LAN communication unit 11, the audio signal AS1 output from the content server 20. The signal output unit 122 transfers the received audio signal AS1 to the signal processing unit 13. In the signal transfer unit 12, the signal input unit 123 receives an audio signal AS4 (a third audio signal) output from the signal processing unit 13. The signal distributing unit 124 distributes (redistributes) the received audio signal AS4 to the audio apparatus 102 (a second audio apparatus), the audio apparatus 103 (a fifth audio apparatus), and the audio apparatus 104 (a sixth audio apparatus) via the wireless-LAN communication unit 11.

The signal processing unit 13 is configured by a digital signal processor (DSP). The signal processing unit 13 performs digital signal processing on the audio signal AS1 transferred from the signal transfer unit 12. The signal processing unit 13 includes a channel expansion unit 131 and a signal generating unit 132. The signal processing unit 13 is provided on the outside of the wireless-LAN communication unit 11 and the signal transfer unit 12. For example, the signal processing unit 13 is provided in an IC chip different from an IC chip on which the signal transfer unit 12 is mounted.

The channel expansion unit 131 executes channel expansion processing for converting (expanding) the audio signal AS1 with a first number of channels into an audio signal AS2 (a second audio signal) with a second number of channels larger than the first number of channels. For example, the channel expansion unit 131 converts (expands) the audio signal AS1 with two channels into the audio signal AS2 with 4.1 channels. As the channel expansion processing, a well-known technique (see, for example, U.S. Pat. No. 7,003,467) can be applied.

The signal generating unit 132 executes, on the basis of the audio signal AS2 generated by the channel expansion processing, signal generation processing for generating audio signals AS3 (AS3 (L) and AS3 (R)) (fourth audio signals) for the audio apparatus 101 and audio signals AS4 (AS4 (L), AS4 (R), and AS4 (W)) (third audio signals) for the audio apparatuses 102, 103, and 104. The signal generating unit 132 outputs the generated audio signals AS3 (AS3 (L) and AS3 (R)) to a power amplifier 14. The power amplifier 14 amplifies the audio signals AS3 (AS3 (L) and AS3 (R)) and outputs the audio signals AS3 (AS3 (L) and AS3 (R)) to the speakers (41L and 41R). The speakers 41 (41L and 41R) output (emit), as sound, the audio signals AS3 (AS3 (L) and AS3 (R)) received from the power amplifier 14.

The signal generating unit 132 outputs the generated audio signals A54 (AS4 (L), AS4 (R), and AS4 (W)) to the signal transfer unit 12. The signal transfer unit 12 distributes (redistributes) the audio signals AS4 (AS4 (L), AS4 (R), and AS4 (W)) input from the signal generating unit 132 to the audio apparatuses 102, 103, and 104 via the signal input unit 123, the signal distributing unit 124, and the wireless-LAN communication unit 11.

The signal processing unit 13 may further execute signal processing such as effect processing suitable for a sound field or effect processing suitable for a multichannel. When such effect processing is executed, even if the audio signal AS3 has the same number of channels (e.g., two channels) as the number of channels of the audio signal AS1, the audio signal AS3 has different characteristics from the characteristics of the audio signal AS1. Effects corresponding to the effect processing can be obtained. Note that, when the effect processing or the like is not executed, the audio signal AS3 may be the same signal as the audio signal AS1 output from the content server 20. In this case, the signal processing unit 13 outputs the audio signal AS1 output from the content server 20 to the power amplifier 14 as the audio signal AS3.

The audio apparatus 102 applies well-known signal processing to the audio signal AS4 (L) received from the audio apparatus 101 and outputs the audio signal AS4 (L) to a speaker 42. The speaker 42 outputs, as sound, the audio signal AS4 (L) received from the audio apparatus 102. The audio apparatus 103 applies the well-known signal processing to the audio signal AS4 (R) received from the audio apparatus 101 and outputs the audio signal AS4 (R) to a speaker 43. The speaker 43 outputs, as sound, the audio signal AS4 (R) received from the audio apparatus 103. The audio apparatus 104 applies the well-known signal processing to the audio signal AS4 (W) received from the audio apparatus 101 and outputs the audio signal AS4 (W) to a speaker 44. The speaker 44 outputs, as sound, the audio signal AS4 (W) received from the audio apparatus 104.

As shown in FIG. 6, in the living room (R1) in which the audio apparatuses 101 to 104 are set, the speakers 41L and 41R function as front speakers, the speakers 42 and 43 function as rear speakers, and the speaker 44 functions as a sub-woofer speaker. Consequently, surround reproduction is realized in the living room (R1).

The audio apparatus 301 (see FIG. 6) distributes the audio signal AS1 (e.g., two channels) received from the content server 20 as explained above to the audio apparatuses 101 and 201, applies the well-known signal processing to the received audio signal AS1, and outputs the audio signal AS1 to speakers 51L and 51R. The speaker 51L outputs the audio signal AS1 (L) as sound. The speaker 51R outputs the audio signal AS1(R) as sound. In the server room (R3) in which the audio apparatus 301 is set, stereo reproduction is realized by the speakers 51L and 51R.

The audio apparatus 201 (see FIG. 6) receives the audio signal AS1 (e.g., two channels) distributed from the audio apparatus 301, applies the well-known signal processing to the received audio signal AS1, and outputs the audio signal AS1 to speakers 61L and 61R. The speaker 61L outputs the audio signal AS1 (L) as sound. The speaker 61R outputs the audio signal AS1(R) as sound. In the kitchen (R2) in which the audio apparatus 201 is set, stereo reproduction is realized by the speakers 61L and 61R.

Figure 8:
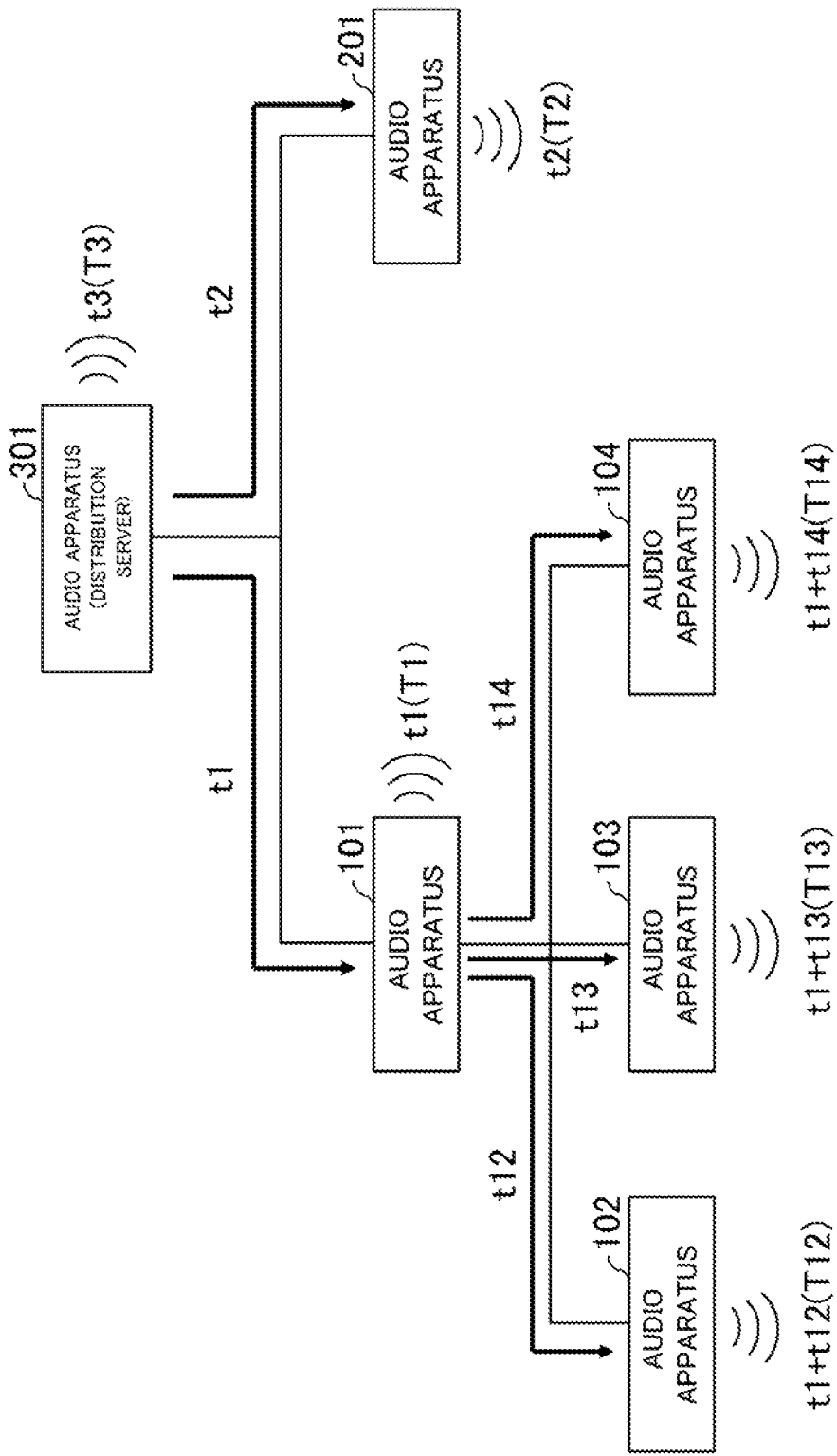
FIG. 8 is a diagram schematically showing a distribution time of an audio signal in the network configuration shown in FIG. 6.

In the audio system 1 according to this embodiment, the audio apparatuses 100 have a function of reproducing content in synchronization with one another. If the network configuration shown in FIG. 6 is referred to as an example, the audio apparatuses 101 to 104, 201, and 301 synchronize, whereby the same content is reproduced in synchronization in the living room (R1), the kitchen (R2), and the server room (R3). In order to realize the function, the control unit 15 (see FIG. 7) of the audio apparatus 100 includes a distribution-time calculating unit 151 and a delay-time calculating unit 152. The distribution-time calculating unit 151 calculates, for example, a time (a distribution time) required from when content (an audio signal) is output from the distribution server to the audio apparatus 100 until the audio apparatus 100 reproduces the content (outputs the content to a speaker). The delay-time calculating unit 152 calculates a time (a delay time) required for the audio apparatus 100 to synchronize with the other audio apparatuses 100. In the following explanation, the distribution time and the delay time are specifically explained with reference to the network configuration shown in FIG. 6 as an example. FIG. 8 is a diagram schematically showing a distribution time of an audio signal in the network configuration shown FIG. 6.

In FIG. 8, "t1" indicates a distribution time (a first distribution time) of an audio signal from the audio apparatus 301 (the distribution server) to the audio apparatus 101, specifically, for example, a time required from when the audio signal is output from the audio apparatus 301 (the distribution server) until the audio signal is reproduced by the audio apparatus 101, "t2" indicates a distribution time (a fourth distribution time) of the audio signal from the audio apparatus 301 to the audio apparatus 201, specifically, for example, a time required from when the audio signal is output from the audio apparatus 301 until the audio signal is reproduced by the audio apparatus 201, and "t3" indicates a processing time of the audio signal in the audio apparatus 301 (the distribution server), specifically, for example, a time required from when the audio apparatus 301 receives the audio signal AS1 until the audio apparatus 301 reproduces the audio signal AS1. In FIG. 8, "t12" indicates a distribution time (a second distribution time) of the audio signal from the audio apparatus 101 to the audio apparatus 102, specifically, for example, a time required from when the audio signal is output from the audio apparatus 102 until the audio signal is reproduced by the audio apparatus 102, "t13" indicates a distribution time (a third distribution time) of the audio signal from the audio apparatus 101 to the audio apparatus 103, specifically, for example, a time required from when the audio signal is output from the audio apparatus 101 until the audio signal is reproduced by the audio apparatus 103, and "t14" indicates a distribution time of the audio signal from the audio apparatus 101 to the audio apparatus 104, specifically, for example, a time required from when the audio signal is output from the audio apparatus 101 until the audio signal is reproduced by the audio apparatus 104. In FIG. 8, "t1+t12" indicates a distribution time of the audio signal from the audio apparatus 301 to the audio apparatus 102, specifically, for example, a time required from when the audio signal is output from the audio apparatus 301 (the distribution server) until the audio signal is reproduced by the audio apparatus 102, "t1+t13" indicates a distribution time of the audio signal from the audio apparatus 301 to the audio apparatus 103, specifically, for example, a time required from when the audio signal is output from the audio apparatus 301 until the audio signal is reproduced by the audio apparatus 103, and "t1+t14" indicates a distribution time of the audio signal from the audio apparatus 301 to the audio apparatus 104 specifically, for example, a time required from when the audio signal is output from the audio apparatus 301 until the audio signal is reproduced by the audio apparatus 104. Note that the distribution time can be calculated using a well-known technique. For example, the distribution time is calculated on the basis of a communication result such as a response time of Ping. The distribution times include a transmission time in a network (e.g., a wireless LAN) and a processing time of signal processing. For example, the distribution time "t1" of the audio apparatus 101 includes a transmission time of the audio signal in the network from the audio apparatus 301 to the audio apparatus 101 and a processing time of well-known digital signal processing, channel expansion processing, signal generation processing, arid the like inside the audio apparatus 101.

The audio system 1 sets, on the basis of times when the times required from when the audio signal is output from the audio apparatus 301 (the distribution server) until the audio signal is reproduced by the audio apparatuses 100 are the longest, delay times "T" (T1, T2, T3, T12, T13, and T14) for adjusting reproduction start times of the audio apparatuses 100. The audio apparatuses 100 reproduce the audio signal on the basis of the set delay times "T". Consequently, it is possible to simultaneously reproduce content (e.g., the "song B") selected by the user in the living room (R1), the kitchen (R2), and the server room (R3). Details of processing for setting delay times (delay time setting processing) are explained below.

Figure 9:
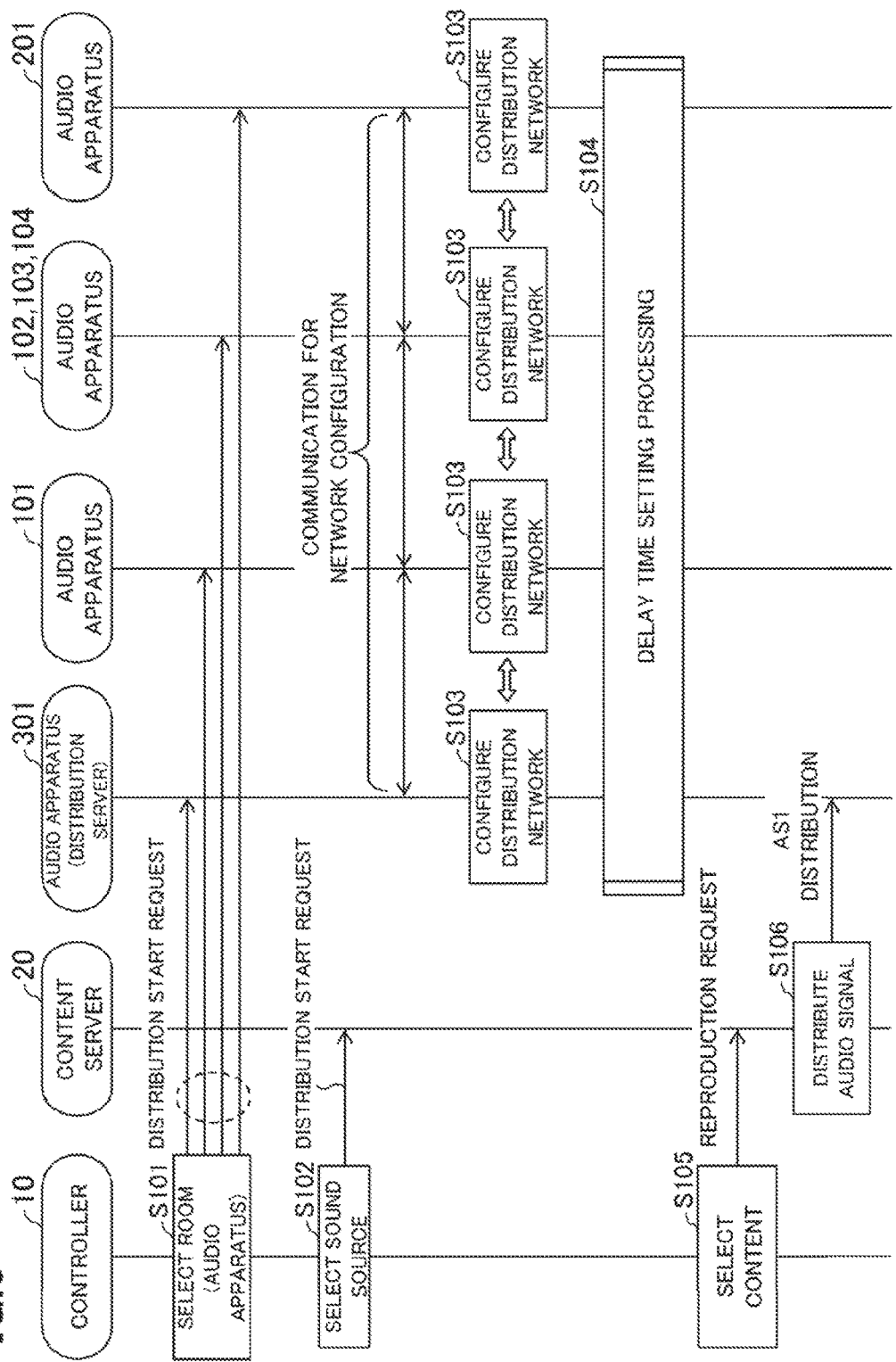
FIG. 9 is a flowchart for explaining an operation example of the audio system according to the embodiment.
Figure 10:
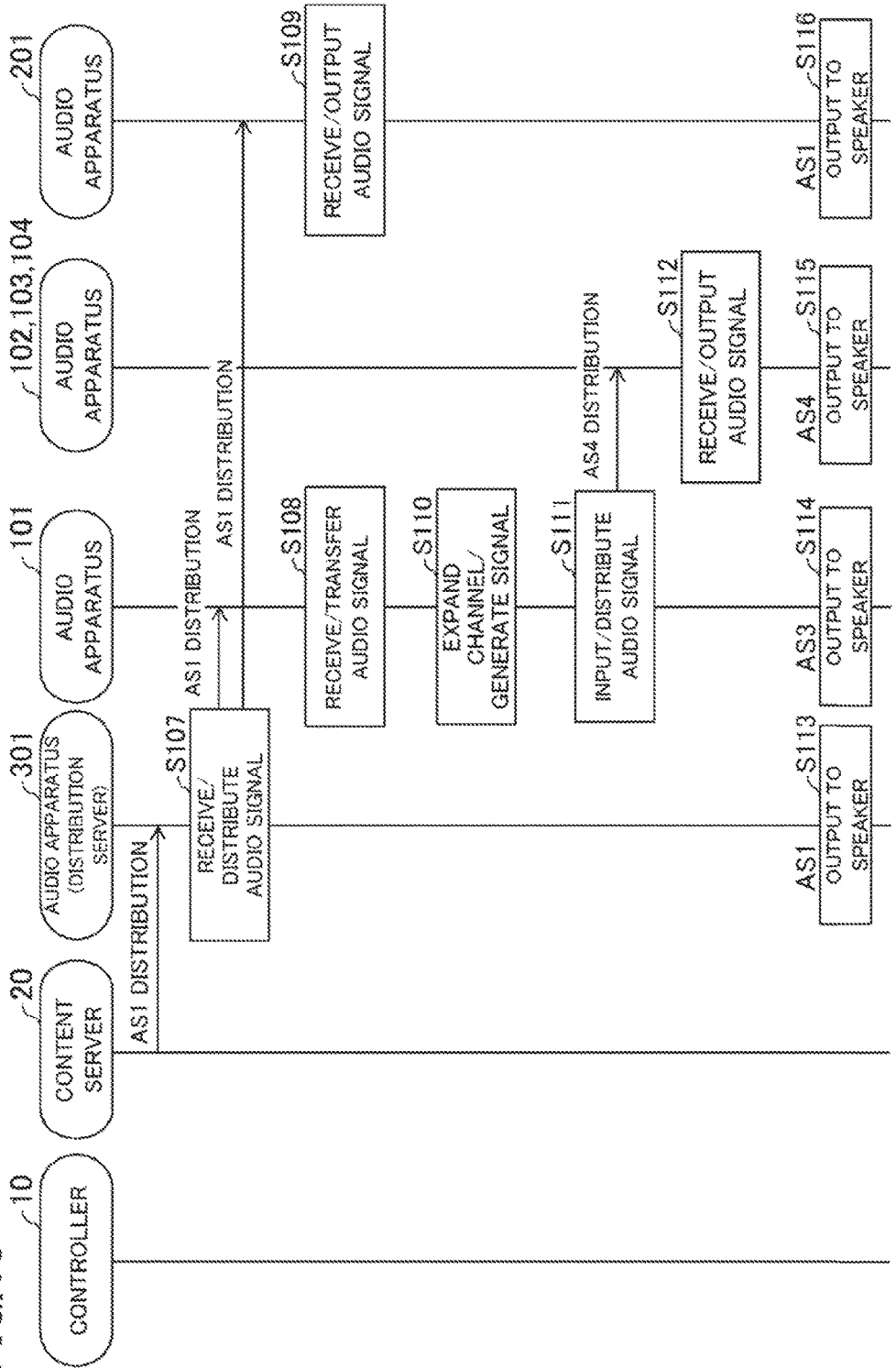
FIG. 10 is a flowchart for explaining the operation example of the audio system according to the embodiment.
Figure 11:
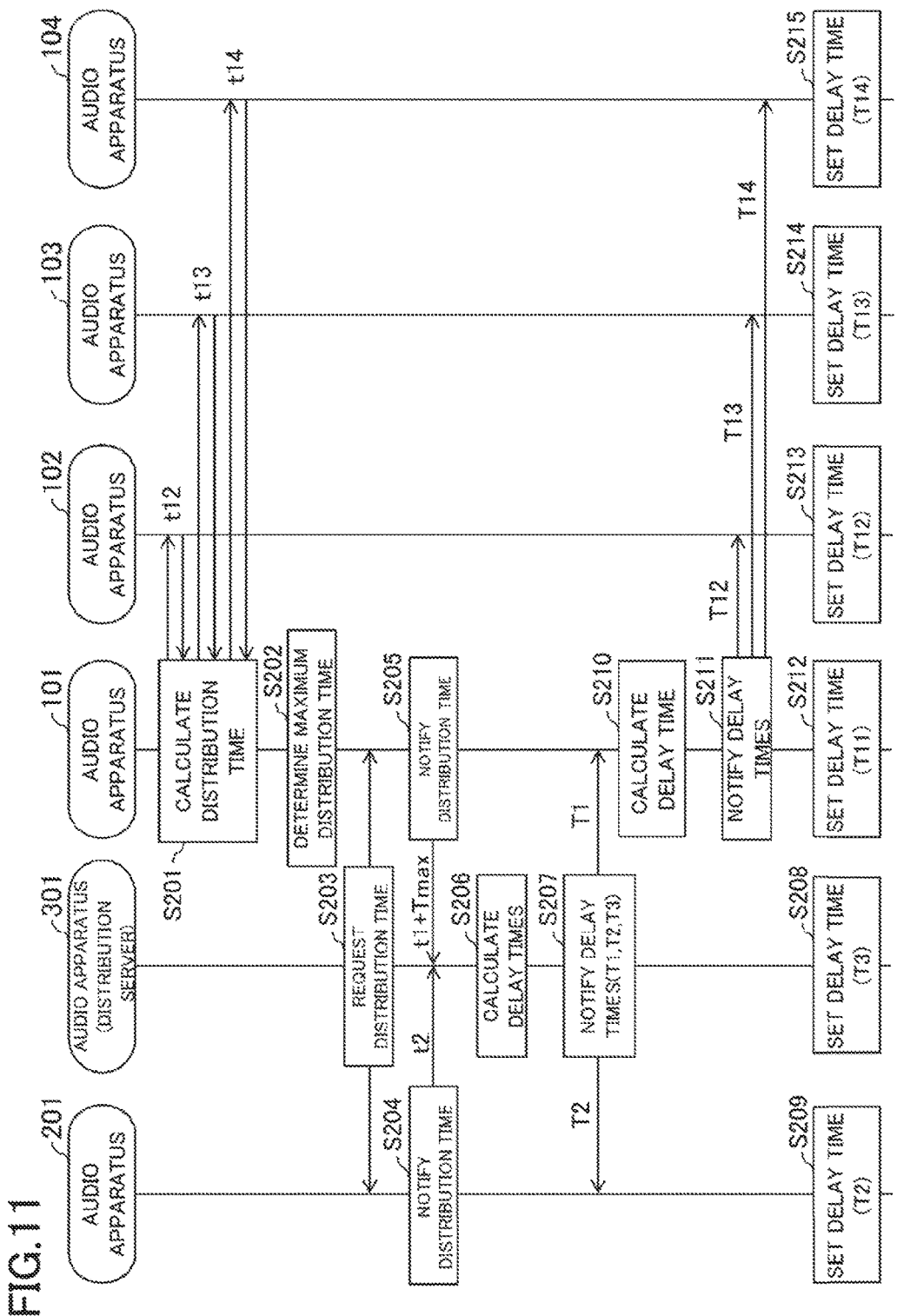
FIG. 11 is a flowchart for explaining an operation example of delay time setting processing in the audio system according to the embodiment.

An operation example of the audio system 1 is explained. FIGS. 9 to 11 are flowcharts for explaining the operation example of the audio system 1. An example is explained in which, as shown in FIG. 6, the audio apparatuses 101 to 104 are set in the living room (R1), the audio apparatus 201 is set in the kitchen (R2), and the audio apparatus 301 functioning as the distribution server is disposed in the server room (R3).

Figure 3:
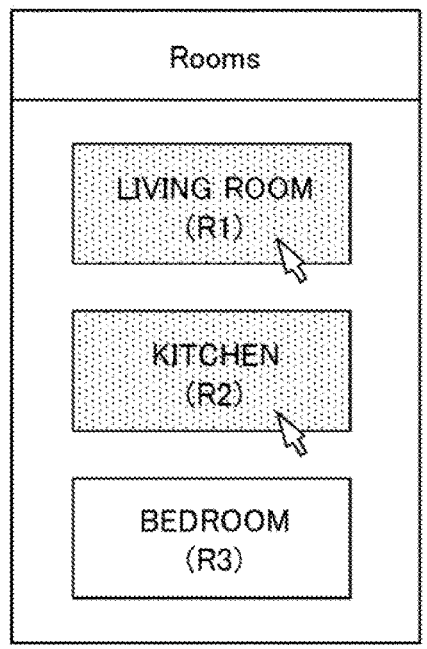
FIG. 3 is a diagram showing an operation screen for selecting a room in which content is reproduced in a controller according to the embodiment.

First, the user selects, on the operation screen shown in FIG. 3 of the controller 10, rooms in which content is reproduced (or audio apparatuses that reproduce the content) (S101). It is assumed that the user selects the living room (R1) and the kitchen (R2) (see FIG. 3). Note that an example is explained in which the content is set to be reproduced in the room (R3) in which the audio apparatus 301 (the distribution server) is disposed. However, the content may be set not to be reproduced in the room. When the user selects the living room (R1) and the kitchen (R2), the controller 10 transmits an instruction for starting distribution of an audio signal (a distribution start request) to the audio apparatuses 101 to 104 set in the living room (R1), the audio apparatus 201 set in the kitchen (R2), and the audio apparatus 301 set in the server room (R3) (S101).

Figure 4:
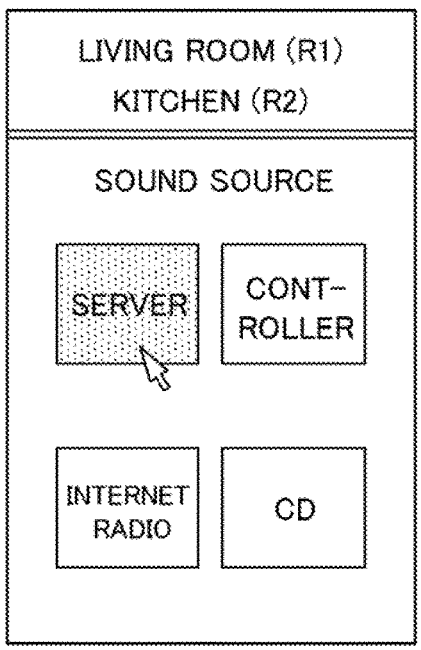
FIG. 4 is a diagram showing an operation screen for selecting a sound source in which content is, for example, saved in the controller according to the embodiment.

Subsequently, the user selects, on the operation screen shown in FIG. 4 of the controller 10, a sound source in which the content is, for example, saved (S102). It is assumed that the user selects the content server 20 (see FIG. 4). Note that it is assumed that a music file reproducible by the audio apparatus 100 is saved in the content server 20. When the user selects the content server 20, the controller 10 transmits an instruction for starting distribution of an audio signal (a distribution start request) to the content server 20 (S102). Subsequently, the audio apparatuses 101 to 104, 201, and 301 mutually perform communication and configure (establish) a network for distributing (transmitting and receiving) the audio signal (a distribution network) (S103).

When the distribution network is configured (S103), the audio apparatus 301 (the distribution server) and the audio apparatuses 101 to 104 and 201 execute processing (delay time setting processing) for synchronize reproduction of the content in the audio apparatuses 101 to 104, 201, and 301 (S104). The delay time setting processing is explained below with reference to FIGS. 8 and 11.

When the delay time setting processing is started, first, the distribution-time calculating unit 151 (see FIG. 7) of the audio apparatus 101 calculates, on the basis of a communication result and the like, the distribution time "t12" in the audio apparatus 102, the distribution time "t13" in the audio apparatus 103, and the distribution time "t14" in the audio apparatus 104 (S201). Note that the distribution-time calculating unit 151 may further adjust the calculated distribution times according to topology (a path) of the distribution network. Specifically, for example, in the case of a stable path with less delay such as the Ethernet (registered trademark) (wired), the distribution-time calculating unit 151 adjusts the distribution time to be short. In the case of an unstable path such as the Wi-Fi (wireless), the distribution-time calculating unit 151 adjusts the distribution time to be long. In the case of a configuration such as an infrastructure network (e.g., a configuration for centrally managing access points), since there are uncertainties of a processing time, that is, the access points on a path, the distribution-time calculating unit 151 adjusts the distribution time to be long. In the case of a configuration such as a mesh network or P2P (e.g., a configuration in which audio apparatuses can directly communicate), since there are few uncertainties on a path, the distribution-time calculating unit 151 adjusts the distribution time to be short. Subsequently, the distribution-time calculating unit 151 of the audio apparatus 101 determines a longest distribution time among the distribution times "t12", "t13", and "t14" as a maximum distribution time "Tmax" (S202).

Subsequently, the audio apparatus 301 requests the audio apparatuses 101 and 201 managed (monitored) by the audio apparatus 301 to notify the distribution times (S203). When receiving the request from the audio apparatus 301, the audio apparatus 201 notifies the audio apparatus 301 of the distribution time "t2" of the audio signal from the audio apparatus 301 to the audio apparatus 201 (S204). When receiving the request from the audio apparatus 301, the audio apparatus 101 notifies the audio apparatus 301 of a distribution time "t1+Tmax" (a total distribution time) obtained by adding up the distribution time "t1" of the audio signal from the audio apparatus 301 to the audio apparatus 101 and the maximum distribution time "Tmax" (S205).

The delay-time calculating unit 152 (see FIG. 7) of the audio apparatus 301 calculates (determines) the delay time "T1" (a first delay time), the delay time "T2" (a second delay time), and the delay time "T3" (a third delay time) of the audio apparatuses 101, 201, and 301 on the basis of the acquired distribution times "t2" and "t1+Tmax" and the time required from when the audio apparatus 301 receives the audio signal AS1 until the audio apparatus 301 reproduces the audio signal AS1 (the processing time "t3") (S206). Specifically, the delay-time calculating unit 152 of the audio apparatus 301 determines, as the delay time ("T1", "T2", or "T3") of a target audio apparatus, a difference between a longest time among the distribution time "t2", the distribution time "t1+Tmax", and the processing time "t3" and the times (the distribution times or the processing times) of the target audio apparatus. For example, when the distribution time "t2" is the longest, the delay-time calculating unit 152 determines the delay time "T2" as "0", determines the delay time "T1" as "t2−(t1+Tmax)", and determines the delay time "T3" as "t2−t3". For example, when the distribution time "t1+Tmax" is the longest, the delay-time calculating unit 152 determines the delay time "T1" as "0", determines the delay time "T2" as "(t1+Tmax)−t2", and determines the delay time "T3" as "(t1+Tmax)−t3". For example, when the processing time "t3" is the longest, the delay-time calculating unit 152 determines the delay time "T3" as "0", determines the delay time "T1" as "t3−T1", and determines the delay time "T2" as "t3−t2". The delay-time calculating unit 152 of the audio apparatus 301 notifies the calculated delay time "T1" to the audio apparatus 101, notifies the calculated delay time "T2" to the audio apparatus 201, and notifies the calculated delay time "T3" to the control unit 15 of the audio apparatus 301 (S207).

When acquiring the delay time "T3", the control unit 15 (see FIG. 7) of the audio apparatus 301 sets the delay time (a standby time) in the audio apparatus 301 to "T3" (S208). When acquiring the delay time "T2", the control unit 15 (see FIG. 7) of the audio apparatus 201 sets the delay time (a standby time) in the audio apparatus 201 to "T2" (320S).

When acquiring the delay time "T1", the delay-time calculating unit 152 (see FIG. 7) of the audio apparatus 101 calculates (determines), on the basis of the delay time "T1", the maximum distribution time "Tmax", and the distribution times "t12", "t13", and "t14", a delay time "T11" in the audio apparatus 101 and the delay time "T12" (a fourth delay time), the delay time "T13" (a fifth delay time), and the delay time "T14" in the audio apparatuses 102, 103, and 104 managed (monitored) by the audio apparatus 101 (S210). Specifically, the delay-time calculating unit 152 of the audio apparatus 101 determines the delay time "T11" as "T1+Tmax", determines the delay time "T12" as "T1+Tmax−t12", determines the delay time "T13" as "T1+Tmax−t13", and determines the delay time "T14" as "T1+Tmax−t14". The delay-time calculating unit 152 of the audio apparatus 101 notifies each of the calculated delay times "T12", "T13", and "T14" to each of the audio apparatuses 102, 103, and 104 (S211).

When calculating the delay time "T11", the control unit 15 (see FIG. 7) of the audio apparatus 101 sets the delay time (a standby time) in the audio apparatus 101 to "T11" ("T1+Tmax") (S212). When acquiring the delay time "T12", the control unit 15 (see FIG. 7) of the audio apparatus 102 sets the delay time (a standby time) in the audio apparatus 102 to "T12" ("T1+Tmax−t12") (S213). When acquiring the delay time "T13", the control unit 15 (see FIG. 7) of the audio apparatus 103 sets the delay time (a standby time) in the audio apparatus 103 to "T13" ("T1+Tmax−t13") (S214). When acquiring the delay time "T14", the control unit 15 (see FIG. 7) of the audio apparatus 104 sets the delay time (a standby time) in the audio apparatus 104 to "T14" ("T1+Tmax−t14") (S215). As explained above, the delay times of the audio apparatuses 101 to 104, 201, and 301 are set. Note that the delay time setting processing (S104) is not limitedly performed during a distribution start of content. The delay time setting processing may be dynamically executed during distribution of the content. Specifically, for example, during the distribution of the content, when a communication result or the like changes or when a time required from when the audio apparatus 100 receives an audio signal until the audio apparatus 100 reproduces the audio signal changes, at a point in time when the change is detected, the delay time setting processing may be executed again.

Figure 5:
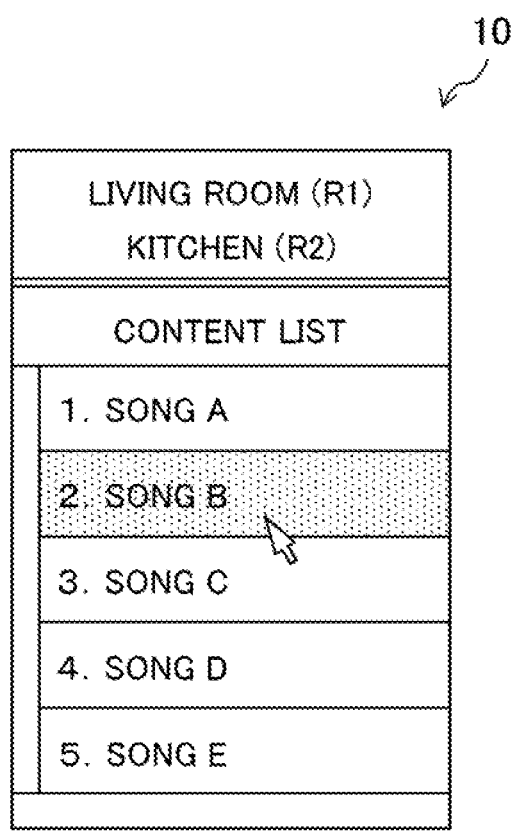
FIG. 5 is a diagram showing an operation screen for selecting content to be reproduced in the controller according to the embodiment.

Referring back to FIG. 9, when the delay-time setting processing (S104) ends, the user selects, on the operation screen shown in FIG. 5 of the controller 10, content to be reproduced (S105). It is assumed that the user selects a music file of the "song B" (see FIG. 5). When the user selects the "song B", the controller 10 transmits an instruction for reproducing the "song B" (a reproduction request.) to the content server 20 (S105). When receiving the reproduction request from the controller 10, the content server 20 distributes the audio signal AS1 corresponding to the "song 3" to the audio apparatus 301 (the distribution server ) (S106). Note that the audio signal distributed by the content server 20 is, for example, an audio signal with two channels.

When receiving the audio signal AS1 from the content server 20, the audio apparatus 301 distributes the audio signal AS1 to each of the audio apparatus 101 and the audio apparatus 201 (S107 in FIG. 10).

When the audio apparatus 101 receives the audio signal AS1 from the audio apparatus 301, the signal transfer unit 12 (see FIG. 7) transfers the audio signal AS1 to the signal processing unit 13 (see FIG. 7) (S108). When receiving the audio signal AS1, the channel expansion unit 131 of the signal processing unit 13 executes channel expansion processing and converts the audio signal AS1 with two channels Into the audio signal AS2 with 4.1 channels. The signal generating unit 132 of the signal processing unit 13 executes signal generation processing or the basis of the audio signal AS2 and generates the audio signals AS3 (AS3 (L) and AS3

(R)) with two channels for the audio apparatus 101 and the audio signals AS4 (AS4 (L), AS4 (R), and AS4 (W)) with 2.1 channels for the audio apparatuses 102, 103, and 104 (S110). Subsequently, when receiving the audio signal AS4 from the signal processing unit 13, the signal transfer unit 12 distributes (redistributes) the received audio signal AS4 to each of the audio apparatuses 102, 103, and 104 (S111).

As explained above, the audio apparatus 301 receives the audio signal. AS1 from the content server 20 (S107). The audio apparatus 101 receives the audio signal AS1 from the audio apparatus 301 (S108). The audio apparatus 201 receives the audio signal AS1 from the audio apparatus 301 (S109). The audio apparatuses 102, 103, and 104 receive the audio signals AS4 from the audio apparatus 101 (S112).

The audios apparatuses 301, 201, 101, 102, 103, and 104 respectively reproduce the received audio signals on the basis of the delay time "T3", "T2", "T11", "T12", "T13", and "T14" set in the delay time setting processing (S104). For example, the audio apparatus 301 outputs the audio signal AS1 to the speakers 51L and 51R (see FIG. 6) after the elapse of the delay time "T3" from the reception of the audio signal AS1 (S113). The audio apparatus 201 outputs the audio signal AS1 to the speakers 61L and 61R (see FIG. 6) after the elapse of the delay time "72" from the reception of the audio signal AS1 (S116). The audio apparatus 101 outputs the audio signal AS3 to the speakers 42L and 41R (see FIG. 6) after the elapse of the delay time "T1+Tmax" from the reception of the audio signal AS1 (S114). The audio apparatus 102 outputs the audio signal AS4 (L) to the speaker 42 (see FIG. 6) after the elapse of the delay time "T1+Tmax-t12" from the reception of the audio signal AS4 (L) (S115). The audio apparatus 103 outputs the audio signal AS4 (R) to the speaker 43 (see FIG. 6) after the elapse of the delay time "T1+Tmax-t13" from the reception of the audio signal AS4 (R) (S115). The audio apparatus 104 outputs the audio signal A34 (N) to the speaker 44 (see FIG. 6) after the elapse of the delay time "T1+Tmax-t14" from the reception of the audio signal AS4 (W) (S115).

According to the processing explained above, surround reproduction of the "song B" in the living room (R1), stereo reproduction of the "song B" in the kitchen (R2), and stereo reproduction of the "song B" in the server room (R3) are executed in synchronization. According to the processing explained above, in particular, even when the processing time "t3" in the audio apparatus 301 functioning as the distribution server is the longest, it is possible to perform synchronised reproduction with the other audio apparatuses 100. Therefore, for example, the processing is suitable, for example, when an output of a speaker is intentionally delayed in order to ad just the output to a video delay of a television connected to the audio apparatus 100 (lip-sync).

With the audio system 1 according to this embodiment, the audio apparatus 101 generates the audio signal AS2 with the second number of channels (e.g., 4.1 channels) on the basis of the audio signal with the first number of channels (e.g., two channels) distributed from the outside and distributes (redistributes) the audio signals AS4 (AS4 (L), AS4 (R), and AS4 (W)) corresponding to a part of the channels (e.g., 2.1 channels) in the generated audio signal AS2 to the audio apparatuses 102, 103, and 104. Consequently, it is possible to, with a simple configuration, expand the number of channels of the audio signal acquired from the outside and redistribute the audio signal. It is possible to realize surround reproduction with a simple configuration. The audio apparatus 101 may output the audio signals AS3 (AS3 (L) and AS3 (R)) corresponding to a part of the channels (2 channels) of the generated audio signal AS2 to the speakers 41L and 41R.

The audio apparatus 101 is a computer that executes, on the basis of the audio system program 15A, the channel expansion processing (S110) and the signal generation processing (S110) by the signal processing unit 13 (signal processing means) and the delay time setting processing (S104) by the control unit 15. The audio system program 15A may be installed from various recording media irrespective of types such as optical and magnetic types or may be downloaded via the Internet.

The audio system 1 according to the present invention is not limited to the embodiment explained above and may have configurations explained below.

In the embodiment, the audio system 1 includes the distribution server (the audio apparatus 301) that manages (monitors) the audio apparatuses 101 and 201. However, the audio system 1 according to the present invention is not limited to this. The distribution server may be omitted. For example, when the user selects only the living room (R1) on the operation screen shown in FIG. 3 of the controller 10, the audio system 1 configures a distribution network with the audio apparatuses 101 to 104. In this configuration, the audio apparatus 101 manages (monitors) the audio apparatuses 102, 103, and 104 and calculates the delay times "T11", "T12", "T13", and "T14" of the audio apparatuses 101, 102, 103, and 104, whereby synchronous reproduction (surround reproduction) in the audio apparatuses 101, 102, 103, and 104 is realized.

In the embodiment, the audio apparatus 101 manages (monitors) the three audio apparatuses 102, 103, and 104. However, the audio system 1 according to the present invention is not limited to this. For example, the audio apparatus 101 may manage (monitor) only one audio apparatus 102. In this configuration, for example, in the delay time setting processing (S205) shown in FIG. 11, the audio apparatus 101 only has to notify the distribution time "t12" in the audio apparatus 102 to the audio apparatus 301 (the distribution server).

In the embodiment, the audio apparatus 301 functions as the distribution server. However, the audio system 1 according to the present invention is not limited to this. For example, the audio apparatus 101 or the audio apparatus 201 may function as the distribution server.

In the embodiment, the audio apparatuses 301 and 101 calculate the delay times and set the delay times in the audio apparatuses 101, 102, 103, 104, 201, and 301. However, the audio system 2 according to the present invention is not limited to this. For example, the audio apparatuses 301 and 101 may give information concerning the calculated delay times to audio signals distributed to the audio apparatuses 101, 102, 103, 104, 201, and 301. The audio apparatuses 301 and 101 nay calculate reproduction times (sound emission times) of the audio signals or the basis of the delay times and notify time stamps indicating the reproduction times to the audio apparatuses 101, 102, 103, 104, 201, and 301. The audio apparatuses 301 and 101 may give the time stamps to the audio signals distributed to the audio apparatuses 101, 102, 103, 104, 201, and 301.

In the embodiment, the audio apparatuses 100 have the same configuration one another (see FIG. 7). However, the audio system 1 according to the present invention is not limited to this. For example, in the audio apparatuses 102, 103, 104, 201, and 301, in the configuration shown in FIG. 7, the signal processing unit 13 does not have to include the channel expansion unit 131 and the signal generating unit 132. In the case of this configuration, the signal processing unit 13 per forms only the well-known digital signal processing.

Figure 12:
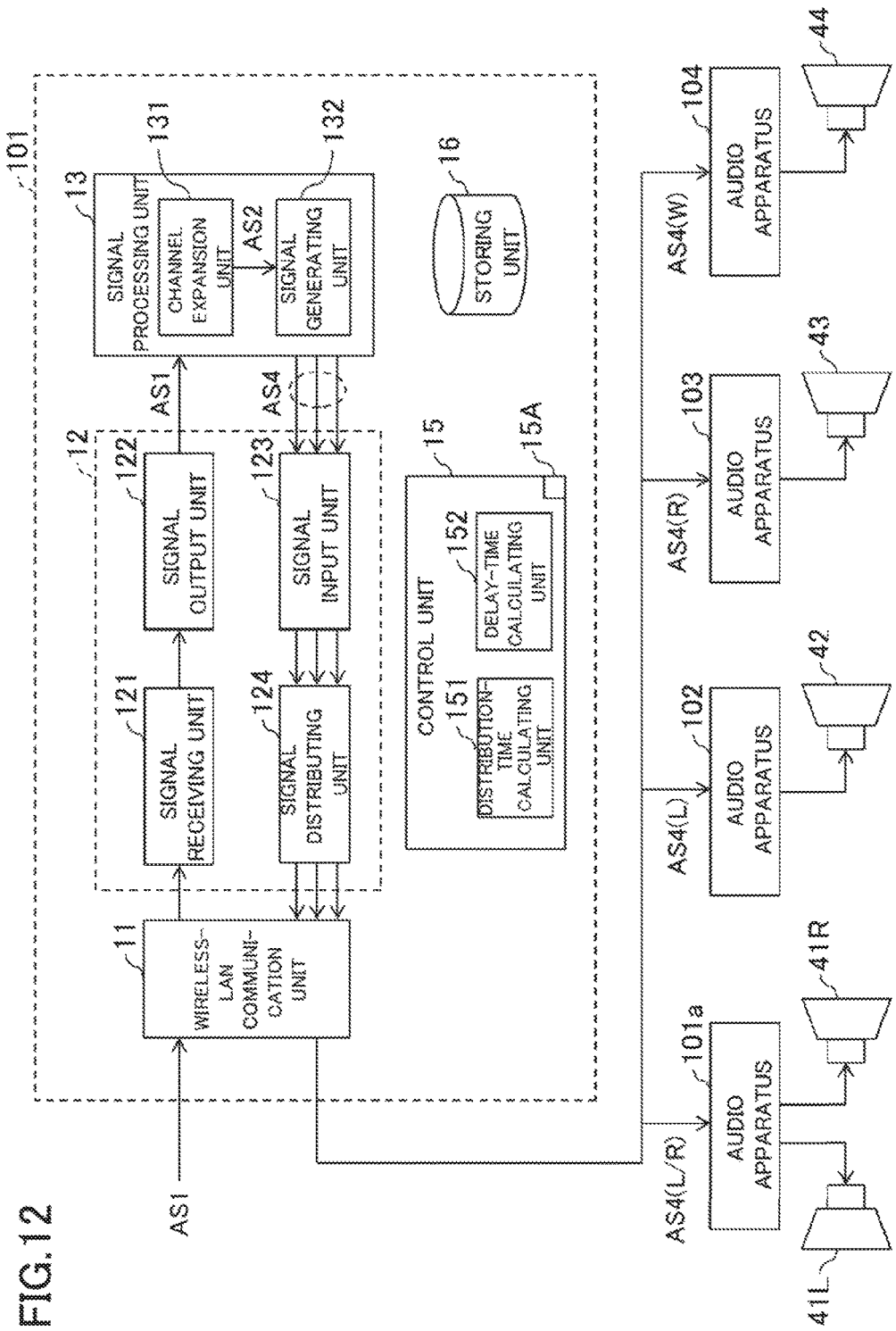
FIG. 12 is a block diagram showing the configuration of an audio apparatus according to the embodiment.

The audio apparatus 100 according to this embodiment is not limited to the configuration shown in FIG. 7. FIG. 12 is a block diagram showing another configuration of the audio apparatus 100. In the configuration shown in FIG. 12, the power amplifier 14 and the speakers 41L and 41R shown in FIG. 7 are connected to the audio apparatus 101 via a network (e.g., wireless). Note that the power amplifier 14 is included in an audio apparatus 101a. In the configuration explained above, for example, the channel expansion unit 131 converts (expands) the audio signal AS1 with two channels into the audio signal AS2 with 4.1 channels. The signal generating unit 132 generates, on the basis of the audio signal A32, audio signals AS4 (AS4 (L/R), AS4 (L), AS4 (R), and AS4 (W)) respectively for the audio apparatuses 101a, 102, 103, and 104. The audio signals AS4 (AS4 (L/R), AS4 (L), AS4 (R), and AS4 (W)) are distributed (redistributed) to the audio apparatuses 101a, 102, 103, and 104 via the wireless-LAN communication unit 11. In this way, the audio apparatus 101 may distribute all audio signals including an audio signal reproduced by the audio apparatus 101 and audio signals with expanded channels to the outside of the audio apparatus 101 as the audio signals AS4.

The channel expansion unit 131 in this embodiment nay convert (expand) the audio signal AS1 with two channels into the audio signal AS2 with 5.1 channels, 6.1 channels, or 7.1 channels. For example, to realize surround reproduction with 5.1 channels, the audio apparatus 101 shown in FIG. 6 only has to further include a center speaker (not shown in FIG. 12). The channel expansion unit 131 only has to convert (expand) the audio signal AS1 with two channels into the audio signal AS2 with 5.1 channels. The signal generating unit 132 only has to generate the audio signals AS3 and AS4 and an audio signal with one channel for the center speaker.

In the network configuration shown in FIG. 6, the audio apparatus 101 may further distribute an audio signal (i.e., with two channels) to the other audio apparatuses 100 (e.g., stereo apparatuses) on the outside. That is, the audio apparatus 101 may function as a distribution server. In this case, the audio apparatus 101 only has to convert the audio signal AS1 with two channels distributed from the audio apparatus 301 (the distribution server) into, for example, the audio signal AS2 with 6.1 channels, reproduce the audio signal AS3 with two channels in the audio apparatus 101, distribute the audio signal AS4 with 2.1 channels to the audio apparatuses 102 to 104, and distribute the audio signal AS4 with two channels to the stereo apparatus. As another method, the audio apparatus 101 may convert the audio signal AS1 with two channels into, for example, the audio signal AS2 with 4.1 channels, reproduce the audio signal AS3 with two channels in the audio apparatus 101, distribute the audio signal AS4 with 2.1 channels to the audio apparatuses 102 to 104, and distribute (transfer) the audio signal AS1 with two channels received from the audio apparatus 301 (the distribution server) to the stereo apparatus without applying signal processing to the audio signal AS1 with two channels.

The various kinds of processing in the control unit 15 in this embodiment may be realized by software as explained above, may be realized by a hardware circuit such as an FPGA (Field Programmable Gate Array), an AS1C (Application Specific Integrated Circuit), or an ASSP (Application Specific Standard Product), or maybe realized by cooperation of the software and the hardware circuit.

Figure 13:
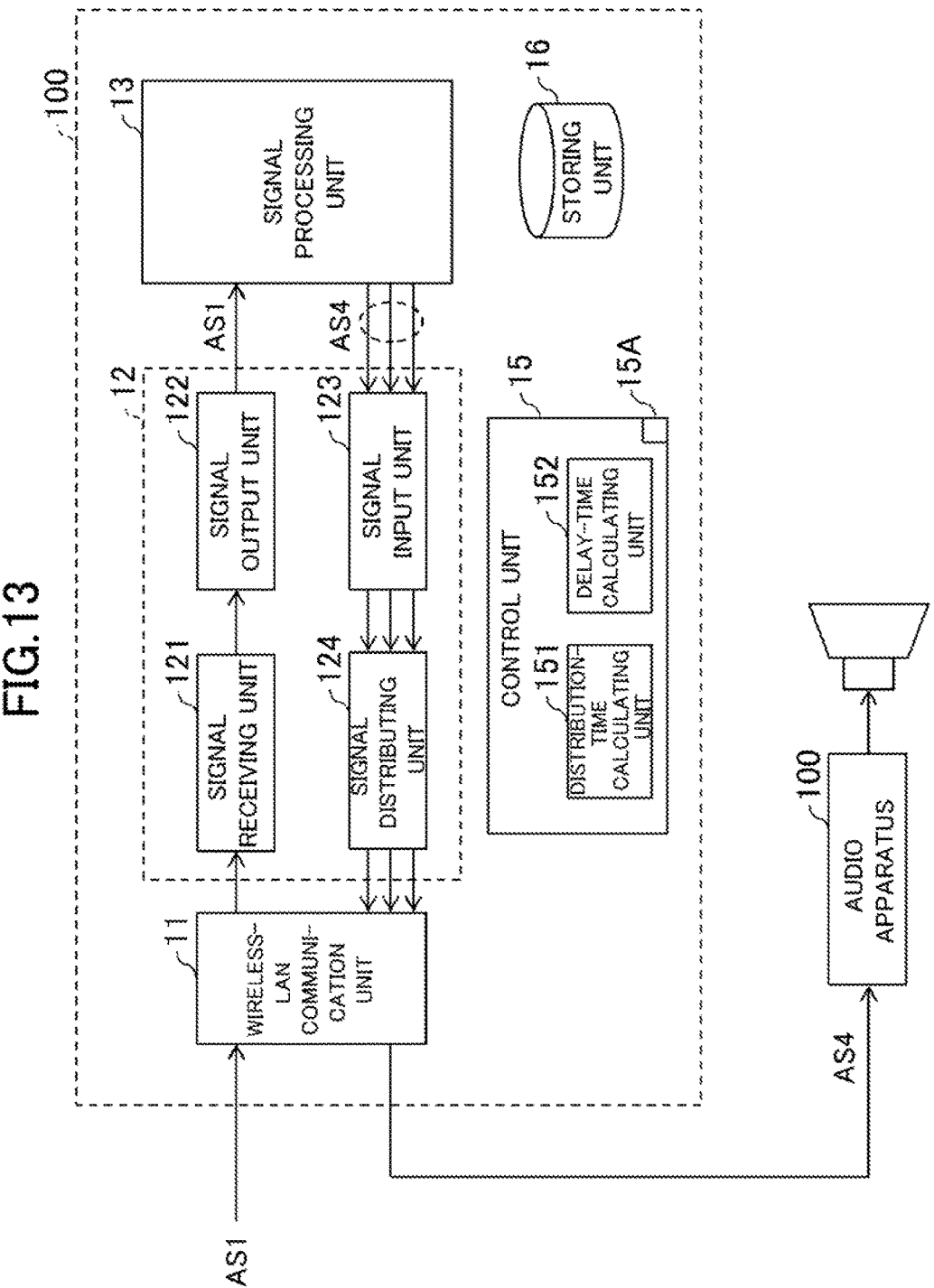
FIG. 13 is a block diagram showing the configuration of an audio apparatus according to the embodiment.

As explained above, the audio apparatus 100 according to this embodiment may include, for example, a configuration shown in FIG. 13. That is, the audio apparatus 100 includes the signal processing unit 13 that generates, on the basis of the first audio signal AS1 with a first number of channels received from the outside of the audio apparatus 100, a second audio signal with a second number or channels larger than the first number of channels and the wireless-LAN communication unit 11 that transmits the third audio signal AS4 corresponding to a part of the channels in the second audio signal generated by the signal processing unit 13 to the other audio apparatuses 100 on the outside connected to the audio apparatus 100 via a network. Consequently, it is possible to, with a simple configuration, expand the number of channels of an audio signal received from the outside and redistribute the audio signal to the other audio apparatuses.

The audio apparatus 100 according to this embodiment can be realized as a control apparatus. For example, the control apparatus includes at least one processor and at least one memory. A plurality of instructions (computer programs) executed by the processor are stored in the memory. For example, the computer programs include the channel expansion processing (S110), the signal generation processing (S110), and the delay time setting processing (S104) executed by the processor. The control apparatus (the audio apparatus 100) may execute the computer programs stored in the memory in advance or may sequentially download the computer programs stored in a cloud server to the control apparatus and execute the computer programs. The control apparatus (the audio apparatus 100) may execute, on the cloud, the computer programs stored in the cloud server without downloading the computer programs to the control apparatus. Note that the processor may be configured by a CPU or may be configured by a DSP.

The embodiment of the present invention is explained above. However, the present invention is not limited to the embodiment. It goes without saying that forms changed from the embodiment by those skilled in the art as appropriate without departing from the spirit of the present invention are also included in the technical scope of the present invention.

What is claimed is:

1. An audio system comprising:
  a first audio apparatus that receives a first audio signal with a first number of channels;
  a second audio apparatus connected to the first audio apparatus via a network, wherein
    the first audio apparatus includes:
      a signal processing unit configured to generate, on the basis of the first audio signal received from an outside of the first audio apparatus, a second audio signal with a second number of channels larger than the first number of channels; and
      a communication unit configured to transmit a third audio signal corresponding to a part of the channels in the second audio signal generated by the signal processing unit to the second audio apparatus, wherein the signal processing unit generates a fourth audio signal for the first audio apparatus and the third audio signal for the second audio apparatus on the basis of the second audio signal; and
  a third audio apparatus, a fourth audio apparatus, and a fifth audio apparatus connected to the first audio apparatus and the second audio apparatus via the network wherein the third audio apparatus transmits the first audio signal received from the outside of the third audio apparatus to the first audio apparatus and the fourth audio apparatus, the first audio apparatus transmits the third audio signal to the second audio apparatus and the fifth audio apparatus, the first audio apparatus calculates a first distribution time of the first audio signal from the third audio apparatus to the first audio apparatus, a second distribution time of the third audio signal from the first audio apparatus to the second audio apparatus, and a third distribution time of the third audio signal from the first audio apparatus to the fifth audio apparatus, determines, as a maximum distribution time, a longer distribution time of the calculated second distribution time and the calculated third distribution time and notifies the third audio apparatus of a total distribution time obtained by totaling the calculated first distribution time and the determined maximum distribution time, the fourth audio apparatus notifies the third audio apparatus of a fourth distribution time of the first audio signal from the third audio apparatus to the fourth audio apparatus, the third audio apparatus further calculates, on the basis of the total distribution time, the fourth distribution time, and a processing time required from when the third audio apparatus receives the first audio signal until the third audio apparatus reproduces the first audio signal, a first delay time for the first audio apparatus to reproduce the fourth audio signal, a second delay time for the fourth audio apparatus to reproduce the first audio signal, and a third delay time for the third audio apparatus to reproduce the first audio signal, and the first audio apparatus further calculates, on the basis of the first delay time and the maximum distribution time, a fourth delay time for the second audio apparatus to reproduce the third audio signal and a fifth delay time for the fifth audio apparatus to reproduce the third audio signal.

2. The audio system according to claim 1, wherein the first audio apparatus reproduces the first audio signal after a total time obtained by totaling the first delay time and the maximum distribution time elapses from the reception of the first audio signal from the third audio apparatus, the second audio apparatus reproduces the third audio signal after a time obtained by subtracting the second distribution time from the total time elapses from the reception of the third audio signal from the first audio apparatus, the fifth audio apparatus reproduces the third audio signal after a time obtained by subtracting the third distribution time from the total time elapses from the reception of the third audio signal from the first audio apparatus, the fourth audio apparatus reproduces the first audio signal after the second delay time elapses from the reception of the first audio signal from the third audio apparatus, and the third audio apparatus reproduces the first audio signal after the third delay time elapses from the reception of the first audio signal.

3. The audio system according to claim 1, wherein
when the fourth distribution time is longest among the fourth distribution time, the total distribution time, and the processing time, the third audio apparatus determines the second delay time as "0", determines the first delay time as a time obtained by subtracting the total distribution time from the fourth distribution time, and determines the third delay time as a time obtained by subtracting the processing time from the fourth distribution time, when the total distribution time is longest among the fourth distribution time, the total distribution time, and the processing time, the third audio apparatus determines the first delay time as "0", determines the second delay time as a time obtained by subtracting the fourth distribution time from the total distribution time, and determines the third delay time as a time obtained by subtracting the processing time from the total distribution time, and when the processing time is longest among the fourth distribution time, the total distribution time, and the processing time, the third audio apparatus determines the third delay time as "0", determines the first delay time as a time obtained by subtracting the first distribution time from the processing time, and determines the second delay time as a time obtained by subtracting the fourth distribution time from the processing time.

4. The audio system according to claim 3, further comprising a sixth audio apparatus to which the third audio signal is input from the first audio apparatus, wherein the audio system performs surround reproduction with the first audio apparatus, the second audio apparatus, the fifth audio apparatus, and the sixth audio apparatus, and the first audio apparatus, the second audio apparatus, the third audio apparatus, the fourth audio apparatus, the fifth audio apparatus, and the sixth audio apparatus reproduce same content in synchronization.

5. The audio system according to claim 1, further comprising an operation terminal that receives, from a user, operation for selecting an audio apparatus to reproduce content and content to be reproduced.

6. The audio system according to claim 1, further comprising an audio apparatus on the outside connected to the first audio apparatus via the network, wherein the first audio apparatus transmits the third audio signal to the second audio apparatus and transmits the first audio signal to the audio apparatus on the outside.

7. The audio system according to claim 2, wherein
when the fourth distribution time is longest among the fourth distribution time, the total distribution time, and the processing time, the third audio apparatus determines the second delay time as "0", determines the first delay time as a time obtained by subtracting the total distribution time from the fourth distribution time, and determines the third delay time as a time obtained by subtracting the processing time from the fourth distribution time, when the total distribution time is longest among the fourth distribution time, the total distribution time, and the processing time, the third audio apparatus determines the first delay time as "0", determines the second delay time as a time obtained by subtracting the fourth distribution time from the total distribution time, and determines the third delay time as a time obtained by subtracting the processing time from the total distribution time, and when the processing time is longest among the fourth distribution time, the total distribution time, and the processing time, the third audio apparatus determines the third delay time as "0", determines the first delay time as a time obtained by subtracting the first distribution time from the processing time, and determines the second delay time as a time obtained by subtracting the fourth distribution time from the processing time.

8. The audio system according to claim 7, further comprising a sixth audio apparatus to which the third audio signal is input from the first audio apparatus, wherein the audio system performs surround reproduction with the first audio apparatus, the second audio apparatus, the fifth audio apparatus, and the sixth audio apparatus, and the first audio apparatus, the second audio apparatus, the third audio apparatus, the fourth audio apparatus, the fifth audio apparatus, and the sixth audio apparatus reproduce same content in synchronization.

* * * * *